Patented Mar. 25, 1924.

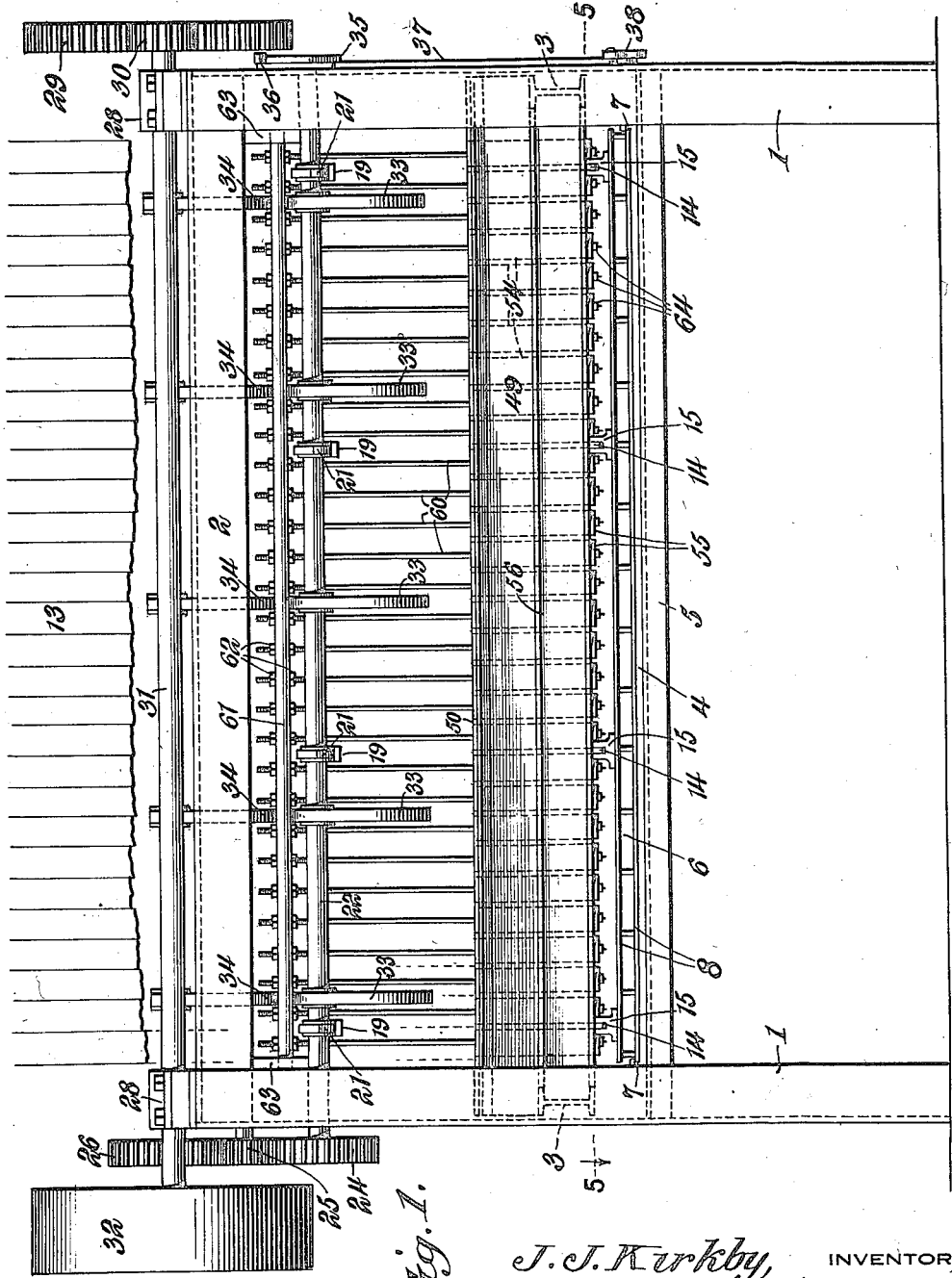

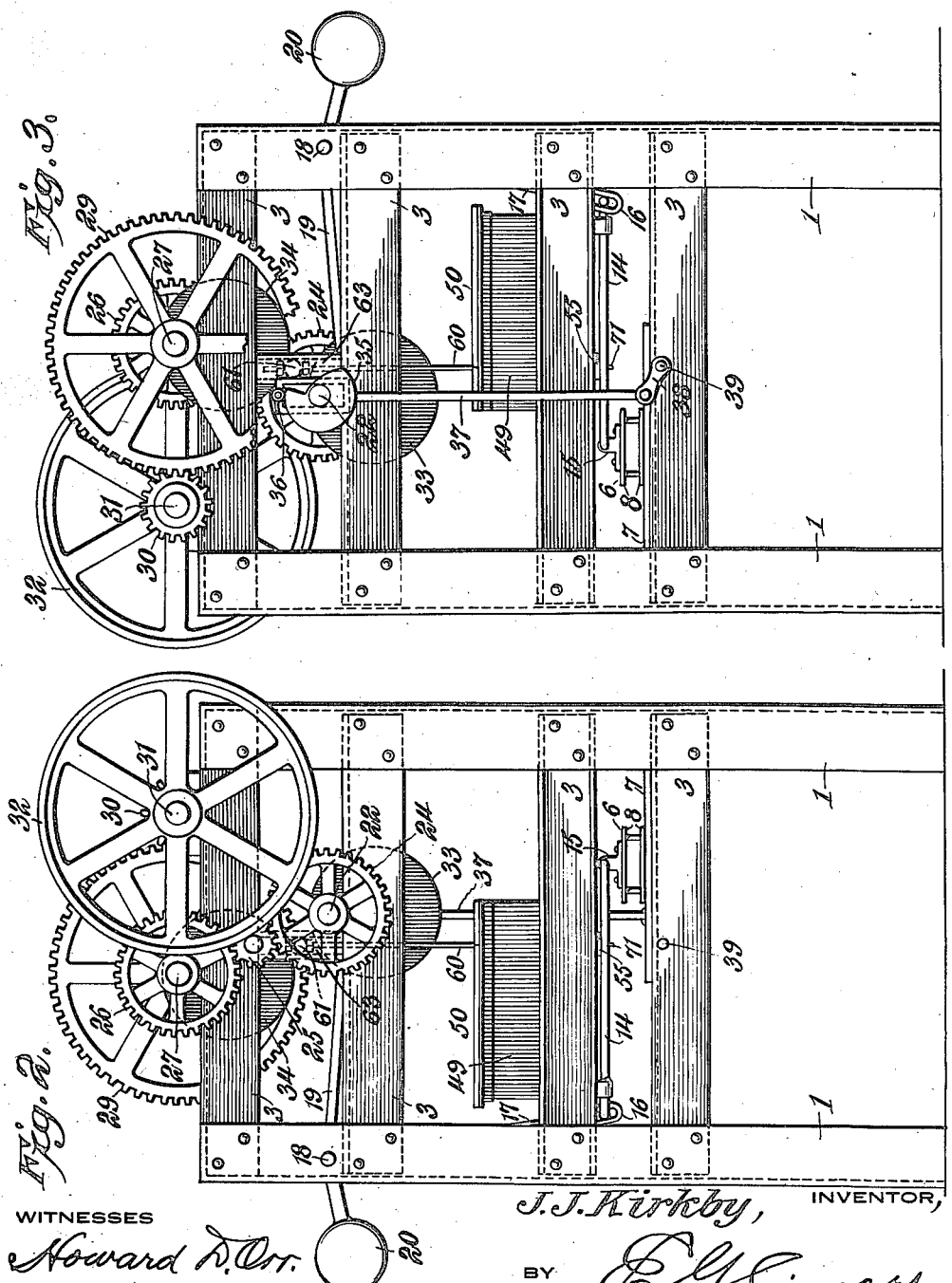

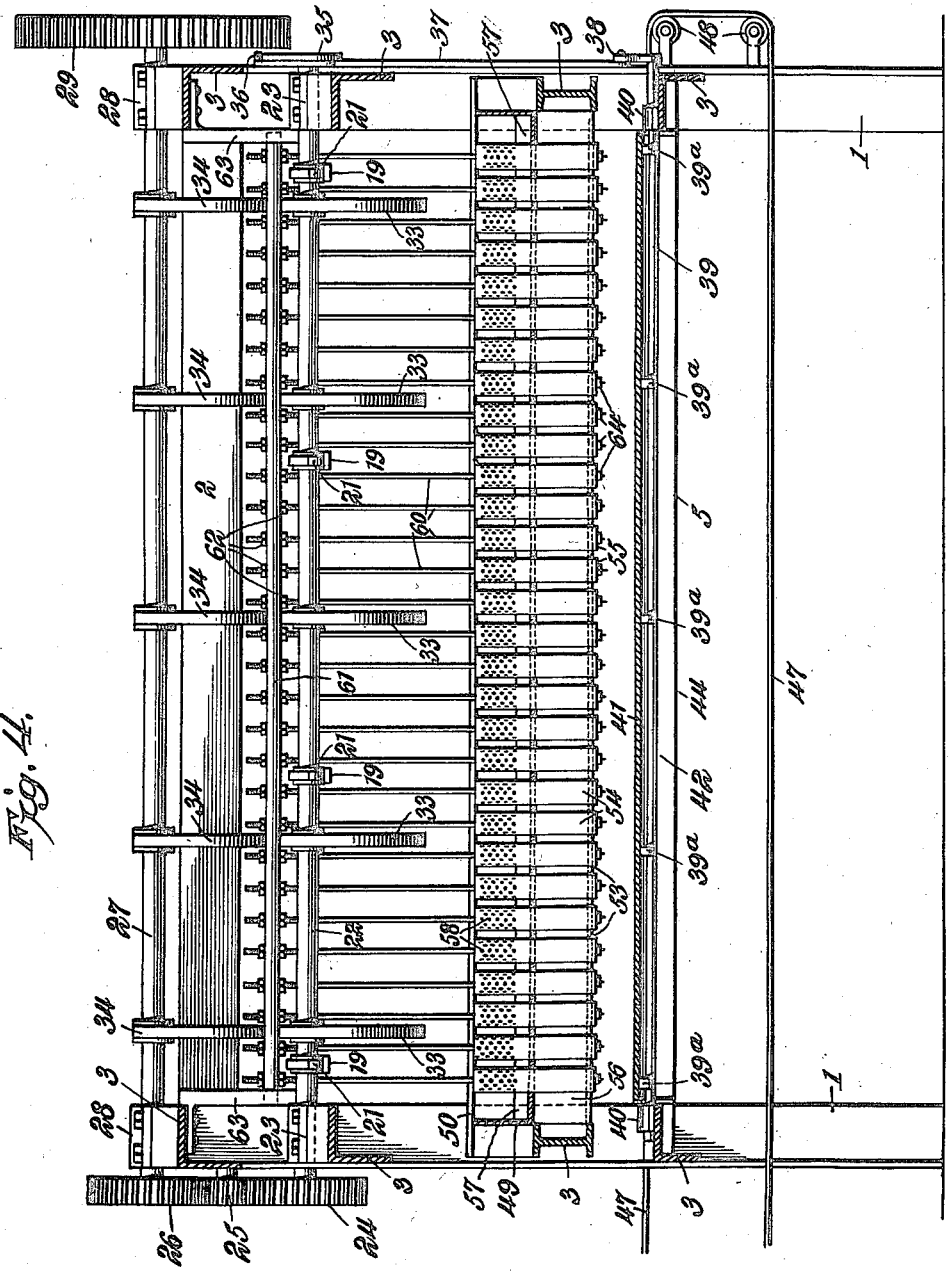

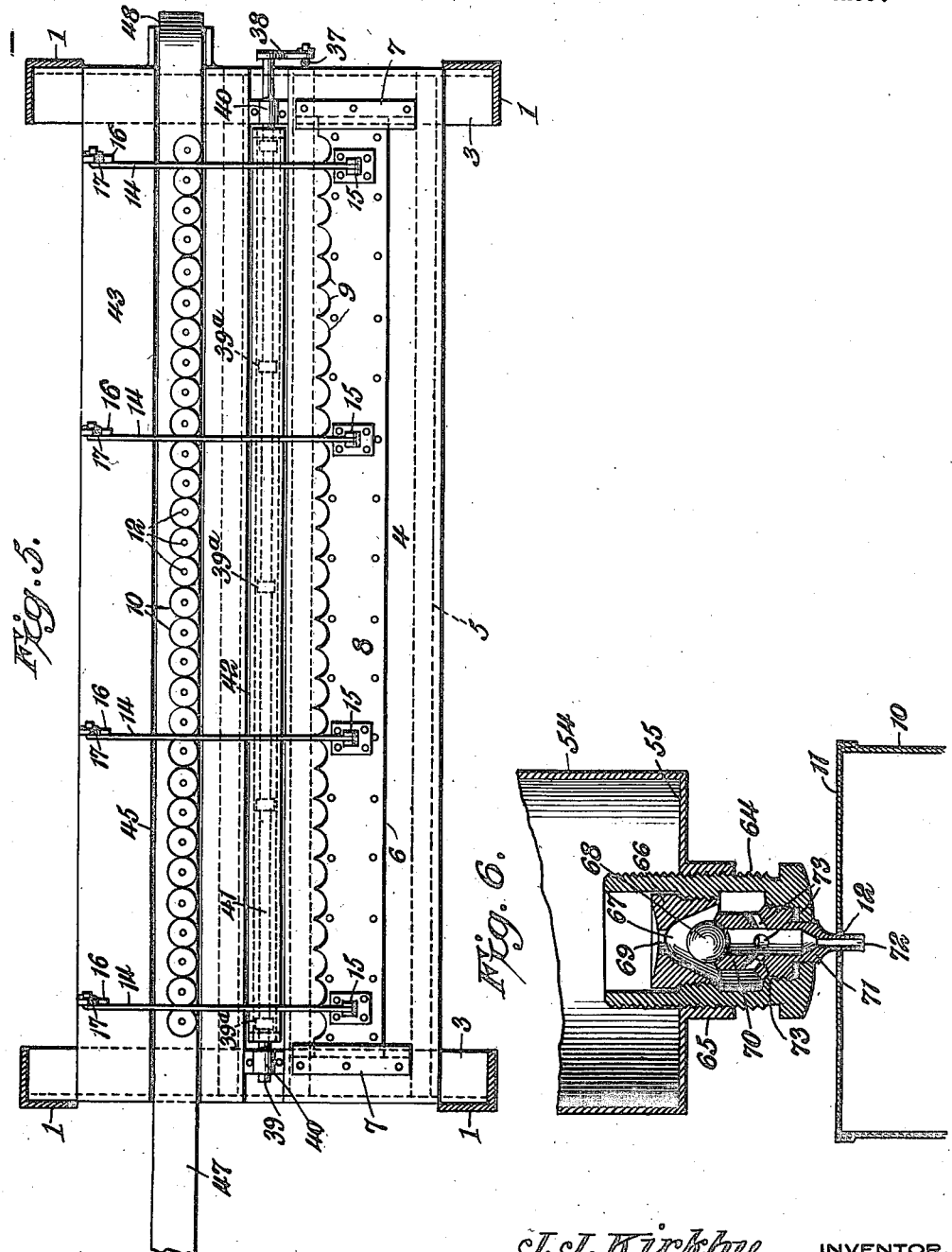

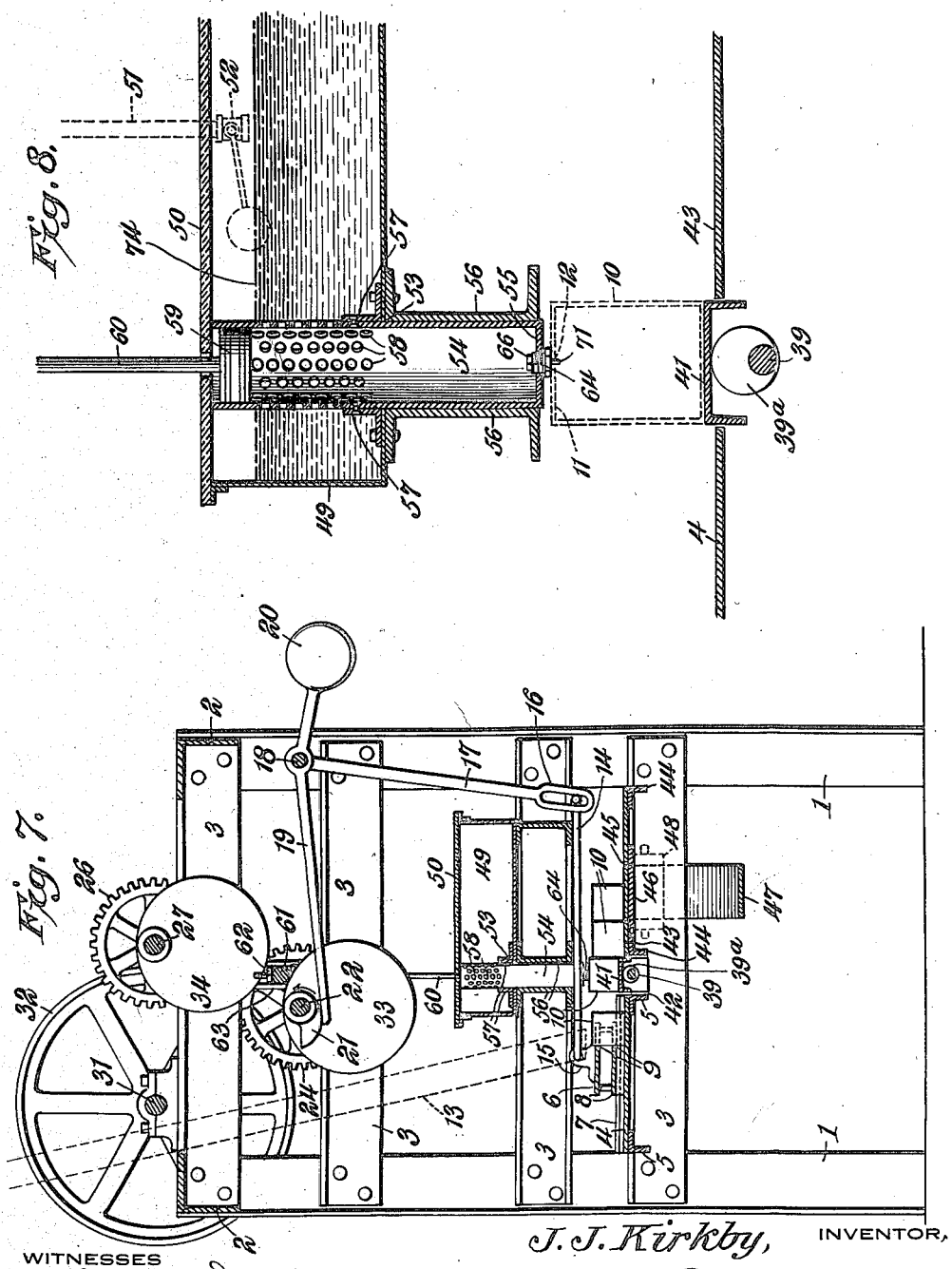

1,487,951

UNITED STATES PATENT OFFICE.

JACQUES J. KIRKBY, OF CLYMER, NEW YORK, ASSIGNOR TO EARL J. BELLINGER, OF SHERMAN, NEW YORK.

CAN-FILLING MACHINE.

Application filed March 21, 1919. Serial No. 283,998.

*To all whom it may concern:*

Be it known that I, JACQUES J. KIRKBY, a citizen of the United States, residing at Clymer, in the county of Chautauqua and State of New York, have invented a new and useful Can - Filling Machine, of which the following is a specification.

This invention has reference to machines for filling cans with liquid and while not confined to any particular kind of liquid is intended more particularly for filling cans with evaporated or condensed milk, wherefore, in the following description and for the purpose of simplicity of description, reference will be made to milk as the material filled into the cans without, however, any limitation to such specific material.

The main object of the invention is to prevent short weight filling and to protect the cans from access of foreign matter before they are filled. The invention also permits the filling of the containers with sweetened condensed milk at a minimum cost in both labor and material and effects a material saving in tin ordinarily used for caps in covering large filling holes.

In accordance with the invention, a multiplicity of cans is filled at one operation and then by automatic machinery the cans are moved out of the filling zone for transportation to soldering apparatus and another group of cans is moved into position for filling, the operations being carried on continuously. Provision is made for varying the feed of the milk to the cans so that the same machine may be readily adjusted for large or small cans, such as are customarily used. The invention further contemplates accurate measurement of the milk and the rapid movement of the milk from a reservoir thereof into the cans.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Figure 1 is a front elevation of the machine.

Figure 2 is an end elevation as seen from the left hand end of Figure 1.

Figure 3 is an end elevation as seen from the right hand end of Figure 1.

Figure 4 is a longitudinal vertical section.

Figure 5 is a section on the line 5—5 of Figure 1.

Figure 6 is a detail section, on a larger scale than the other figures, of the discharge end of one of the can-filling structures.

Figure 7 is a vertical front to rear section through the machine looking toward the left hand end of Figure 1.

Figure 8 is a detail section showing a can-filling device.

Referring to the drawings, there is shown a main frame composed of uprights or legs 1, longitudinal beams 2 and cross beams 3, these several parts being conveniently made of structural metal but may be made in any manner and of any material adapted for the purpose.

Near the bottom of the main frame but in suitable elevated relation there is provided a longitudinally extended table 4 supported by strips 5 fast to the main frame and carrying an elongated slide 6 mounted at the ends in guides 7 whereby the slide may be reciprocated crosswise of the main frame for an appropriate distance. The slide is shown in the drawings as comprising spaced plates 8, one above the other, and these plates each have along one edge a series of notches or recesses 9, the recesses of one plate matching those of the other, and these recesses are suitably spaced and suitably shaped to receive a series of cans 10 shown in Figures 5, 6, 7 and 8. The cans 10 are of the type usually employed for receiving milk and each can has a head 11 permanently fast thereon, said head having a central perforation or passage 12 of suitable size to be afterward closed by a drop of solder in accordance with the usual practice. These holes 12 are usually called vent holes. The arrangement is such that the final sealing of the filled can represents a considerable reduction in expense, both in solder and labor.

In the machine shown in the drawings, thirty cans may be filled simultaneously, but it is to be understood that the machine may be built to handle more or less than thirty cans at a time. The cans are fed to the table 4 through chutes 13, shown fragmentarily in full lines in Figure 1 and in dotted lines in Figure 7, but omitted from the other figures of the drawings. The chutes may contain a succession of cans so arranged as to gravitate into the path of the slide 6, dropping onto the table 4 in front of the slide when the slide is retracted and temporarily resting on the slide when the slide is advanced to feed a set of cans into position for filling.

In order to reciprocate the slide the latter is connected to a series of links 14 pivoted to ear brackets 15 on the slide at different points along the length thereof and each link 14 at the end remote from the slide engages in an elongated loop 16 at one end of a rock arm 17 fast to and depending from a rock shaft 18 mounted at a higher point in the main frame. See Fig. 7. The rock shaft 18 carries a series of arms or fingers 19 on one side of its axis and an overbalancing weight 20 on the other side of its axis. In position to engage the arms 19 there are cams 21 mounted on a shaft 22 journaled near the ends in bearings 23 on cross beams 3 of the main frame. At one end the shaft 22, beyond the main frame, carries a gear wheel 24 meshing with an idler pinion 25 in turn meshing with a gear wheel 26 on one end of a countershaft 27 journaled in bearings 28 on the main frame, these bearings being, in the particular instance shown, at a higher point than the bearings 23. At the end of the shaft 27 remote from the gear wheel 26 is another gear wheel 29 meshing with a pinion 30 on a power shaft 31 also extending throughout the length of the main frame and provided with a pulley 32 by means of which the moving parts of the machine may be driven by suitably applied power. The shaft 22 carries a series of cams 33 and the shaft 27 carries a series of cams 34. Moreover, the shaft 22 at the end remote from the gear wheel 24 is provided with a cam disk 35 with the periphery of which engages a roller 36 on one end of a rod or pitman 37 pivotally connected to a crank arm 38 on one end of a rock shaft 39 having journal bearings 40 and extending lengthwise of the machine to one side of the floor 4 and traversing an elongated follower 41 mounted to move up and down in a space 42 between one edge of the table 4 and the adjacent edge of another table 43 on a level with the table 4. The shaft 39 carries a series of eccentrics 39$^a$ to cause the up and down movement of the follower 41. The table 43 is carried by strips or bars 44 mounted on the main frame. The table 43 has a longitudinal slot 45 therealong beneath which is a strip 46 bridging the slot and constituting a support for the upper run of a conveyer belt 47. This belt is continued beyond one end of the main frame to a suitable point of disposal, being designed to receive and convey filled cans. At one end of the machine the conveyer belt 70 is carried about direction-changing pulleys 48.

At a suitable point in the main frame there is mounted a tank 49 designed to contain the milk to be filled into the cans 10. This tank has a two-part cover 50 which may be of transparent material so that the contents of the tank may be observed. The tank is fed from any suitable source through a pipe 51 terminating in a float valve 52 (see Fig. 8), whereby the level of milk in the tank may be maintained constant. The bottom of the tank is pierced by passages 53 through which project tubes 54, each with a bottom head 55, the upper end of each tube being covered by the plate 50. The tubes are held in place at the bottom of the tank by beams 56 which may be riveted or otherwise secured to the bottom of the tank, while strips 57 are secured to the tubes 54 within the tank 49 and are also secured to the beams 56, whereby the beams 56 may constitute supports for the corresponding portion of the tank.

That part of each tube or cylinder 54 which is located within the tank 49 is pierced by numerous rows of perforations 58, these rows being staggered and circularly arranged and the perforations extending from about the level of liquid within the tank to about the level of the bottom of the tank. The provision of these perforations prevents anything in the nature of a fly or other foreign matter from entering the cylinder, in which case it would eventually be driven into the can along with the milk.

Each cylinder 54 contains a piston 59 on the end of a piston rod 60 and each piston rod extends through the divided portion of the two-part cover plate, and above the latter through a bar 61 and is threaded above and below the bar, there receiving lock nuts 62. The bar 61 moves at the ends along guides 63 permitting the bar to rise and fall and causing a like rise and fall of the pistons 59 carried by the piston rods 60 fast to the bar. The pistons 59 and cylinders 54 carrying them constitute pumps, whereby milk from the reservoir 49 may be delivered into the cans 10. To accomplish this, each cylinder 54 has a delivery nozzle comprising a substantially cylindrical section 64 (see Fig. 6) threaded into a boss 65 on the head 55 of the cylinder 54, the threaded portion being long enough to provide for cans of different heights. Threaded into the upper end of the nozzle 64 is a bushing 66 having an internal cavity 67 to receive and seat a ball valve 68 lodged within the cavity, the latter communicating through a passage 69 with the interior of the cylinder 54. The valve 68 has a seat on top of an enlarged end 70 of a filling tube 71 constituting a part of the enlargement and through which filling tube there is a constantly open bore 72 communicating through ports 73 in the enlargement 70 with the cavity 67. When the valve 68 is on the enlargement or seat 70 the interior of the cylinder 54 has free communication with the lower end of the filling tube 71 by way of the cavity 67, ports 73 and bore 72 to the can. The cross sectional area of each perforation 58 is larger than that of the passage 69; the area of the passage is greater than the area of any of the ports 73; while each port is larger than the bore 72.

Assuming that there is a quantity of milk in the reservoir 49, which milk is indicated at 74 in Figure 8, and that cans are being caused to gravitate through the chutes 13, and further that power is applied to the pulley 32, the feeding slide 6 is reciprocated toward and from the follower 41 and the latter is lifted and lowered through the action of the rockable cam shaft 39. A relatively large number of cans is operated upon at one time but an understanding of the invention will be facilitated by considering but one can and its course through the machine. A can 10 may be considered as resting upon the table 4 in advance of the slide 6 and lodged in one of the notches 9. As the cams 21 move into engagement with the arms 19 the latter rock the shaft 18, lifting the weight 20 and by means of the arms 17 advance the slide 6 through the connection of the links 14 therewith. This causes the engaged can to move onto the follower 41 and the parts are so timed that when this occurs the follower is lifted by the cams 39ª as the slide moves out of the way and returns into position to receive another can. The lifting action of the follower is sufficient to raise the can so that the nozzle structure above it will enter the passage 12 of the can. While this action is occurring the cams 34, which are at the high position, engage the rod 61 carrying the piston rods 60 and pistons 59, the movement being in the direction to force the pistons 59 toward the bottom of the cylinders 54. Considering but one piston, the movement during the initial stages carries the piston through the perforated part of the cylinder within the reservoir 49. The resistance to the passage of milk through the constricted bore 72 is such that the milk within the perforated end of the cylinder returns to the reservoir. As soon, however, as the perforated zone is passed the only escape for the milk is through the bore 72 and consequently the milk from the cylinder is forced out into the can 10 during the remainder of the active stroke of the piston. The parts are so timed that as soon as the active stroke of the piston is completed the cam 33 becomes active to lift the rod 61 and so return the pistons 59 to their uppermost position. During this return stroke the suction of the piston is sufficient to raise the valve 68 and hold it raised so as to prevent any milk still within the cylinder 54 from escaping through the outlet or filling nozzle. The parts are so timed that as soon as the can is filled another can is moved toward the follower, which, in the meantime, lowers and the filled can is pushed from the follower by the next empty can in order, and ultimately the filled cans are moved onto the conveyor belt 47 to be taken from the machine and delivered to a suitable point where the openings 12 may be closed by solder.

The filling of the cans is a continuous one, that is, a group of cans is moved into position to be filled and the cans are then filled while another group of cans is being assembled and moved toward the filling position, to ultimately discharge the filled cans from the filling position and replace them by cans to be themselves filled.

In the preceding description reference has been made to the filling of the cans with liquid and specific reference has been made to the filling of the cans with evaporated or condensed milk. The machine is, however, especially adapted to handling condensed or sweetened milk which has considerably greater body than evaporated milk or cream. Heretofore it has been necessary to use cans with filling holes of considerable size and because of the thickness of the milk the filling tubes are also of considerable cross sectional area. In accordance with the invention the filling tubes employed are of relatively small area and of far less size than has heretofore been employed. In fact machines embodying the principles of this invention are in successful operation filling cans with sweetened condensed milk where the cans have vent holes no larger than three thirty-seconds of an inch, or approximately the size of an ordinary pin-head. Because of the thickness of sweetened milk the machine must be much more sturdily built than would be necessary with the milk product known as evaporated milk, and at the same time permitting filling tubes or nozzles of small cross sectional area, thus rendering it possible to provide cans with small filling openings whereby there is a marked saving in the cost of both labor and material in sealing the cans after being filled. This is due to the elimination of relatively larger caps to cover the large holes now used. Then, too, the small size of filling openings keeps out dust and other foreign matter from the cans when shipped empty and also effects a great saving in solder.

What is claimed is:—

1. In a can filling machine, a reservoir for liquid, a plurality of cylinders within and extending below the reservoir, with a portion of each cylinder within the reservoir having its walls perforated and below the reservoir having its walls imperforate, and at the lower end having a valve discharge opening, a piston reciprocable in each cylinder, beams extending below and supporting the reservoir on opposite sides of those portions of the cylinders below the reservoir, and a top for the reservoir so that the cylinders are enclosed therein, said top having passages therethrough for the piston rods.

2. In a can filling machine, a reservoir for liquid to be filled into the cans, a plurality of cylinders within and extending below the reservoir with a portion of each cylinder within the reservoir having its walls perforated and below the reservoir having its walls imperforate and at the lower end having a valved discharge opening, a piston reciprocable in each cylinder, and beams extending below and supporting the reservoir on opposite sides of those portions of the cylinders extending below the reservoir and in engagement with the walls of said cylinders.

3. In a can filling machine, a reservoir for liquid to be filled into the cans, a plurality of cylinders within and extending below the reservoir with a portion of each cylinder within the reservoir having its walls perforated and below the reservoir having its walls imperforate and at the lower end having a valved discharge opening, a piston reciprocable in each cylinder, and beams extending below and supporting the reservoir on opposite sides of those portions of the cylinders extending below the reservoir and in engagement with the walls of the cylinders, the reservoir containing angle strips extending lengthwise of the series of cylinders on opposite sides thereof and secured to the bottom of the reservoir as well as to the walls of the cylinders.

4. In a can filling machine, a reservoir for liquid to be filled into the cans, a plurality of cylinders within and extending below the reservoir with a portion of each cylinder within the reservoir having its walls perforated and below the reservoir having its walls imperforate and at the lower end having a valved discharge opening, a piston reciprocable in each cylinder, and beams extending below and supporting the reservoir on opposite sides of those portions of the cylinders extending below the reservoir, the reservoir containing angle strips extending lengthwise of the series of cylinders on opposite sides thereof, and a top for the reservoir covering the upper ends of the cylinders and having passages therethrough for the piston rods.

5. In a can filling machine, a pump having a discharge nozzle, said nozzle including a substantially cylindrical section provided with external screw threads, a pump cylinder having a screw-threaded boss of smaller diameter than the cylinder on its lower end and projecting therefrom and adapted to hold the cylindrical nozzle section in adjusted position, said nozzle section opening into the cylinder at its inner end and being long enough to provide when adjusted for cans of different heights, and a valve housed within the nozzle and opening toward the discharge end and closing toward the interior of the cylinder.

6. In a can filling machine, a pump having a discharge nozzle, said nozzle including a substantially cylindrical section provided with external screw threads, the pump cylinder having a screw-threaded boss on its lower end projecting therefrom and holding the cylindrical nozzle section in adjusted position, said section being open to the cylinder at its inner end and being long enough to provide when adjusted for cans of different heights.

7. In a can filling machine, a pump including a cylinder and a piston, said cylinder having a discharge nozzle, a filling tube removably attached within said nozzle and projecting outwardly from the closed lower end thereof, the lower end of said filling tube being adapted to enter minute openings in the cans, the upper end of the filling tube being relatively large and having a valve seat therein, a valve operated by gravity to close the upper end of the filling tube, and means whereby the commodity to be forced into the cans may be caused to pass into the filling tube and through the projecting lower end of the same around the valve when the valve closes the upper end of the filling tube.

8. In a can filling machine, a nozzle structure for delivering liquid from a reservoir thereof into cans with small filling orifices, the nozzle structure including an exit tube extending beyond and into the nozzle and within the nozzle having at its inner end a valve seat and below the valve seat provided with ports leading from the interior of the nozzle into the interior of the tube, a second valve seat at the inlet end of the nozzle, an inlet opening to said nozzle at the second valve seat, and a valve adapted to operate between the two valve seats to close either said inlet opening or the inner end of said tube, causing the liquid to pass around the valve and through the said ports.

9. In a can filling machine, a nozzle structure for delivering liquid from a reservoir thereof into cans with small filling orifices, the nozzle structure including an exit tube extending beyond and into the nozzle and within the nozzle having an enlarged portion with ports leading from the interior of the nozzle into said enlarged portion, a valve seat at the inlet end of the nozzle, and a valve between the enlarged portion of the tube and the valve seat closing toward the inner end of the nozzle.

10. In a can filling machine, a nozzle structure for delivering liquid from a reservoir thereof into cans with small filling orifices, the nozzle structure including an exit tube extending beyond and into the nozzle and within the nozzle having an enlarged portion with ports leading from the interior of the nozzle into said enlarged portion, a valve seat at the inlet end of the nozzle, and a valve between the enlarged portion of the tube and the valve seat closing toward the inner end of the nozzle, said valve seat being in the form of a cavity of greater spread than the enlarged end of the tube and the nozzle being interiorly larger than the enlarged portion of the tube where extending to the cavity, whereby liquid when forced through the nozzle and outlet tube thereof takes a devious course about the valve and through the ports into the interior of the outlet tube.

11. A can filling machine for relatively heavy liquids comprising a reservoir for the liquid, measuring pump structures communicating with the reservoir and provided with pistons for forcing the liquid from the pumps into the cans, a rod connected to and actuating the pistons, and oppositely working cams on opposite sides of the rod and having simultaneously acting operating means for positively reciprocating the pistons in both directions.

12. A can filling machine for relatively heavy liquids comprising a reservoir for the liquid, measuring pump structures communicating with the reservoir and provided with pistons for forcing the liquid from the pumps into the cans, a rod connected to and actuating the pistons, and oppositely working cams on opposite sides of the rod and having simultaneously acting operating means for positively reciprocating the pistons in both directions, each piston rod being threaded where traversing the carrying rod and provided with adjusting means whereby the zone of stroke of the pistons may be varied.

13. In a can filling machine for relatively heavy liquids, a reservoir for the liquid, pumps entering the reservoir and having discharge means below the reservoir for directing the liquid into cans through relatively small nozzles, the pumps having cylinders with passages through their walls for the flow of liquid from the reservoir into the cylinders, reciprocatory pistons in the cylinders having a range of movement along the perforated walls and along imperforate walls beyond the passages in the direction of the power strokes of the pistons, piston rods for the pistons extending beyond the cylinders, a carrying member for the piston rods with the latter extending through the carrying member and there threaded and provided with lock nuts for varying the effective lengths of the piston rods, cams engaging opposite sides of the piston rod carrier and acting oppositely thereon, and gearing for driving the cams simultaneously in the same direction whereby the pistons are positively driven on both the active and retracting strokes and determined quantities of liquid are forced into the cans by the pumps in accordance with the adjustment of the piston rods.

14. In a can filling machine, a pump having a discharge nozzle, said nozzle including a substantially cylindrical section provided with external screw threads, the pump cylinder having a screw threaded boss on its lower end projecting therefrom and holding the cylindrical nozzle section in adjusted positions, said section being open to the cylinder at its inner end and being long enough to provide when adjusted for cans of different heights, and a filling tube removably attached within said section and projecting outwardly from the closed lower end thereof and adapted to enter minute openings in the cans.

15. In a can filling machine, a pump including a cylinder having a discharge nozzle at its lower end, said cylinder including a portion having a plurality of staggered rows of perforations in circular relation, a reservoir for liquid within which the perforated portion of the cylinder extends, a cover plate for the reservoir and cylinder and resting on the upper or inner end of the cylinder, means for feeding liquid into the reservoir, and a piston reciprocable in the cylinder and having a piston rod extending out through said cover plate.

16. In a can filling machine, a pump including a cylinder having a discharge nozzle at its lower end, said cylinder including a portion having a plurality of staggered rows of perforations in circular relation, a reservoir for liquid within which the perforated portion of the cylinder extends, a cover plate for the reservoir and for the upper or inner end of the cylinder, means for feeding liquid into the reservoir, means for controlling the height of the liquid in the reservoir so that liquid rises only as high as the uppermost of the perforations, and a piston reciprocable in the cylinder and having a piston rod extending out through said cover plate.

17. A can filling machine, including a cylinder having a discharge nozzle at its lower end, said cylinder including a portion having perforations, said nozzle including a cylindrical section, a bushing held within the latter and having a passage therein, a filling tube held upon the cylindrical section and extending part way within the same but spaced from the bushing, a valve operating between the filling tube and the bushing, a longitudinal bore through the filling tube, and a plurality of ports extending transversely of the filling tube and provided on that part contained within the cylindrical section.

18. A can filling machine, including a cylinder having a discharge nozzle at its lower end, said cylinder including a portion having perforations, said nozzle including a cylindrical section, a bushing held within the latter and having a passage therein, a filling tube held upon the cylindrical section and extending part way within the same but spaced from the bushing, a valve operating between the filling tube and the bushing, a longitudinal bore through the filling tube, and a plurality of ports extending transversely of the filling tube and provided on that part contained within the cylindrical section, the cross sectional area of each perforation being larger than the area of said passage, the passage being larger in area than any of the ports, and each port being larger than the bore of the filling tube.

19. In a can filling machine, a liquid reservoir and means associated therewith for delivering viscous liquids from the reservoir into a can, comprising a cylinder having perforated walls within the reservoir and imperforate walls extending outside the reservoir, the perforations being arranged in a series of rows, a piston movable in the cylinder along and beyond the perforated walls, and a discharge nozzle for delivering liquid into a can and located at the end of the cylinder having the imperforate portion, said nozzle having a filling tube extending partly within and partly without the nozzle, a valve seat provided on the end of said tube within the nozzle, a second valve seat at the inner end of the nozzle adjacent the cylinder, a valve operating between the two valve seats and gravity operated to open the nozzle and lifted by the suction of the pump to close the same, and ports leading into the tube below the valve seat therein and communicating with the interior of the nozzle.

In testimony that I claim the foregoing as my own, I have hereto affixed my signature in the presence of two witnesses.

JACQUES J. KIRKBY.

Witnesses:
Lou F. Bennett,
Fred S. Tewinkle.